Sept. 16, 1958 A. HAHNEL 2,852,679

U. H. F. SPECTRUM GENERATOR AND FREQUENCY MULTIPLIER

Filed Feb. 7, 1956

INVENTOR,
ALWIN HAHNEL.

BY Harry M. Saragovitz

ATTORNEY.

United States Patent Office 2,852,679

Patented Sept. 16, 1958

2,852,679

U. H. F. SPECTRUM GENERATOR AND FREQUENCY MULTIPLIER

Alwin Hahnel, Little Silver, N. J., assignor to the United States of America as represented by the Secretary of the Army

Application February 7, 1956, Serial No. 564,088

7 Claims. (Cl. 250—36)

Figure 1:
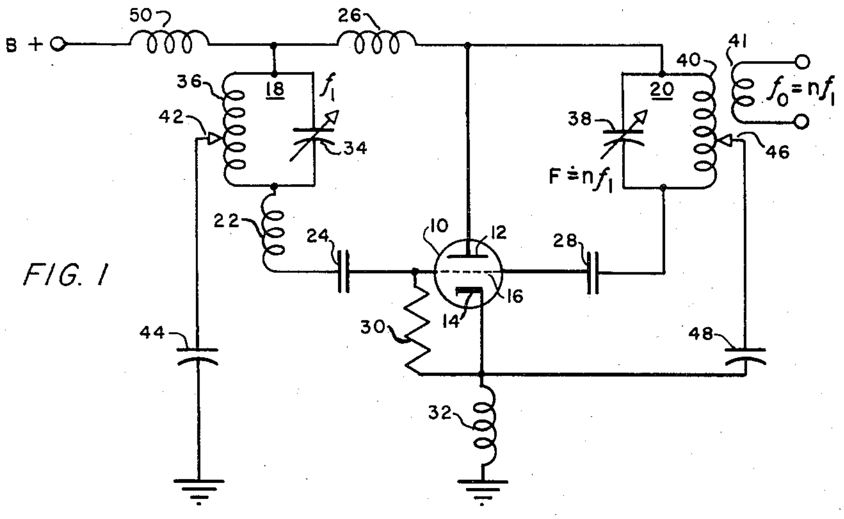

(Granted under Title 35, U. S. Code (1952), sec. 266)

The invention described herein may be manufactured and used by or for the Government for governmental purposes, without the payment of any royalty thereon.

This invention relates to frequency spectrum generators and more particularly to frequency multipliers wherein a high degree of multiplication is desired over a variable range of frequencies.

The usual procedure of frequency multiplication by means of electron discharge devices comprising several electrodes consists in designing the electron discharge device as an amplifier and tuning its output to a frequency $nf$ which is a harmonic of the excitation frequency $f$. These different harmonics vary very greatly in amplitude, being generally of much greater amplitude at the lower harmonic frequencies than at the higher harmonic frequencies. Hence the multiplication systems used heretofore required a large number of stages to provide any extended factor of multiplication. Moreover, the isolation of the desired harmonic frequencies from the many spurious oscillations and unwanted harmonics requires very complicated circuitry and is difficult to achieve.

In my copending application Serial No. 390,265, filed November 4, 1953, now Patent No. 2,816,227, issued Dec. 10, 1957, there is shown a frequency spectrum generator utilizing a single vacuum discharge tube adapted to provide simultaneous oscillations at two frequencies, one of the frequencies being fundamental and the other a multiple frequency thereof. One oscillation frequency is generated in a crystal type oscillator operating at the fundamental to the desired multiple output frequencies and the other oscillation frequency is periodically phase controlled by the fundamental oscillation such that its output frequency spectrum contains only harmonics of the fundamental frequency. Frequencies that are not harmonically related to the crystal frequency are not generated. The spectrum generator operates simultaneously in the range of the desired output frequency and at the crystal controlled frequency fundamental to it. However, inasmuch as crystals are designed to operate over a relatively narrow range of frequencies, such multiplier circuits are impractical where relatively wide variation of the fundamental frequency and multiples thereof are required.

It is therefore an object of the present invention to provide an improved frequency spectrum generator in which the selection of a high order multiplication factor is readily accomplished.

It is another object of the present invention to provide a spectrum generator wherein the fundamental frequency may be varied over a relatively wide range of frequencies.

A further object of the present invention is to provide a spectrum of harmonically related frequencies such that the bandwidth of its amplitude envelope may easily be adjusted from the one which results in a concentration of the output energy at a prescribed harmonic frequency to another bandwidth wide enough to result in an output spectrum consisting of several adjacent harmonics of similar amplitudes.

It is still another object of the present invention to provide a simple frequency multiplier circuit wherein the selection of any high order multiplication factor is readily accomplished by the tuning of a single resonant circuit.

In accordance with the present invention there is provided a frequency spectrum generator which may be operated over a variable range of frequencies. It includes a vacuum tube having at least a plate, a grid, and a cathode, and a pair of discrete resonant circuits coupled between the plate and grid of the vacuum tube. The resonant circuits are adapted to simultaneously generate discrete self-excited oscillations at a fundamental frequency and a prescribed multiple frequency thereof. The multiple frequency oscillation is keyed by the fundamental frequency oscillation such that its phase is periodic at the fundamental frequency. Also included are discrete regenerative feedback control means in circuit with each of the resonant circuits. The feedback in the phase controlling fundamental oscillating circuit determines the maximal amplitude of the fundamental oscillation and the feedback in the phase controlled multiple frequency oscillating circuit determines the width of the frequency spectrum envelope output from the spectrum generator.

For a better understanding of the invention, together with other and further objects thereof, reference is had to the following description taken in connection with the accompanying drawing in which:

Fig. 1 schematically illustrates the frequency spectrum generator, and

Figure 2:
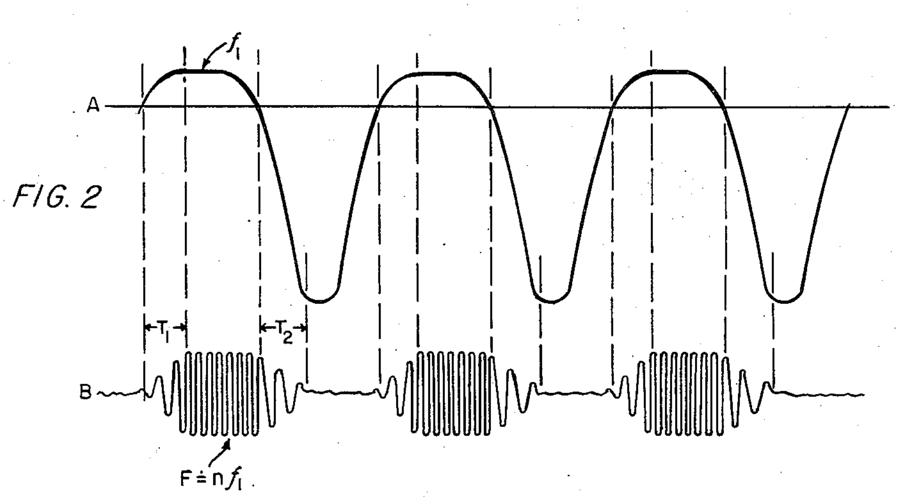
Figure 3:
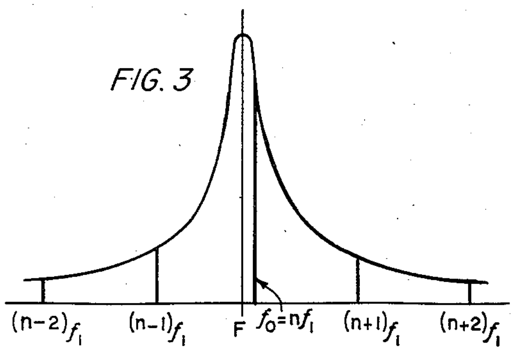
Figure 4:
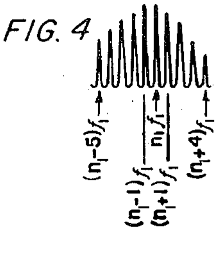

Figs. 2, 3 and 4 show a group of explanatory curves.

Referring now to Fig. 1 of the drawing, the frequency spectrum generator shown therein comprises an electron discharge device 10 having an anode or plate 12, a cathode 14 and a control grid 16. Two discrete tuned resonant circuits 18 and 20, each comprising a parallel arrangement of an inductance and a capacitance, are coupled between grid 16 and plate 12. One terminal of resonant circuit 18 is coupled to grid 16 through series connected inductance 22 and capacitor 24 and the other terminal of circuit 18 is connected to plate 12 through inductance 26. Plate 12 is connected directly to one terminal of tuned circuit 20 and grid 16 is coupled to the other terminal of circuit 20 through capacitor 28. A resistor 30 is connected between grid 16 and cathode 14 to provide a common grid-leak resistor in circuit with both capacitor 24 and capacitor 28. Cathode 14 is connected to ground through choke 32 which functions as a conventional isolating choke for very high radio frequencies. The values of tuning capacitor 34 and inductance 36 comprising resonant circuit 18 are such that this circuit will resonate over a prescribed range of fundamental frequencies designated as $f_1$. Similarly, the values of tuning capacitor 38 and inductance 40 comprising resonant circuit 20 are such that circuit 20 will resonate over a prescribed range of frequencies which are multiples of the selected fundamental frequency $f_1$. Resonant circuit 20 may be tuned to a preselected frequency $F \doteq nf_1$ within the desired output range, $nf_1$ being the desired multiple output frequency $f_0$ of the fundamental frequency $f_1$. To distinguish between preselected frequency F and the desired multiple frequency $f_0 = nf_1$, $f_0$ will hereinafter be referred to as the output frequency. Resonant circuit 20 is conventionally coupled to an output circuit 41, which as explained hereinbelow, provides an output of the desired output frequency $f_0 = nf_1$. A regenerative feedback control circuit for the selected fundamental frequency $f_1$ from resonant circuit 18 is provided by means of a movable tap 42 adapted to be varied in position along inductance 36 and which is coupled to ground through blocking capacitor 44. Similarly, a regenerative feedback control circuit for the preselected frequency F from resonant circuit 20 is provided by means of a movable tap 46 adapted to be positioned along inductance 40 and which is coupled to cathode 14 through blocking capacitor 48. B+ voltage is applied to plate 12 through inductance 50 which is in series connection with inductance 26.

The circuit shown in Fig. 1 provides for simultaneous self-excitation of oscillations at two independent frequencies in a single tube, assuming of course that the fundamental requirement for such simultaneous oscillations is met, namely, that there is a relatively large frequency ratio between the two frequencies. The values of capacitors 28 and 48 associated with resonant circuit 20 are chosen such that the reactances thereof at selected fundamental frequencies $f_1$ are high enough to reduce the shunt action of resonant circuit 18 upon resonant circuit 20. The grid-leak combination of capacitor 24 and resistor 30 and the position of tap 42 along inductance 36 are selected such that the desired fundamental oscillations $f_1$ are maintained at the maximal amplitude consistent with the specifications of tube 10. The values of inductances 22 and 26 associated with resonant circuit 18 are such that at any selected output frequency $f_0=nf_1$ they provide reactances high enough to reduce interference between the two simultaneous oscillations.

In considering the operation of the spectrum generator, reference is made to Figs. 2, 3 and 4. It is assumed that resonant circuit 18 is tuned to a prescribed fundamental frequency $f_1$ and that movable tap 42 is positioned to provide regenerative feedback such that the oscillations at $f_1$ are maintained at maximum amplitude consistent with the specifications of tube 10. It is also assumed that circuit 20 is tuned to the preselected harmonic frequency $F \doteq nf_1$. Both frequencies are generated simultaneously in tube 10 as hereinabove described. The voltage waveforms of both the fundamental frequency $f_1$ and the preselected frequency $F \doteq nf_1$ are illustrated respectively in curves A and B of Fig. 2. The grid voltage shown in curve A of Fig. 2 may be considered to provide a bias such that there is provided a regenerative period and a degenerative period for the prescribed frequency F. As shown, the preselected frequency F is keyed and phase controlled such that its output waveform is periodic at the fundamental frequency $f_1$.

As the amplitude of the fundamental oscillation increases, the mean potential on grid 16 becomes increasingly more negative thus reducing the negative resistance of the circuit and thereby the rate of increase of the oscillation amplitude, until, preferably, an equilibrium amplitude is reached. This build up period is clearly shown in curve B and is represented by the duration $T_1$. The equilibrium amplitude will be maintained until the beginning of the degenerative period where the oscillations at frequency F decay exponentially as represented by the interval $T_2$. This is so because the negative voltage portion of the fundamental sine wave of curve A reduces the transconductance of tube 10 below the value at which the higher frequency circuit is oscillatory. The resonant circuit 20 should be tuned close to the desired output frequency. With frequency F in the vicinity of the desired output multiple frequency $f_0=nf_1$, the output energy from the resonant circuit 20 is concentrated at the desired output frequency $f_0$. As shown in Fig. 3, there appears a frequency spectrum wherein the amplitude of the desired multiple output frequency $f_0=nf_1$ is a maximum only if preselected frequency F is in the close vicinity of $nf_1$. The preselected frequency F does not appear in the output circuit 41 inasmuch as this preselected frequency is periodically phase controlled at the fundamental frequency $f_1$. By such an arrangement the output frequency from circuit 41 is an exact harmonic, or multiple of the fundamental frequency. This is a well known principle and it is believed that no further description is necessary. Of course, if it is desired to shift the multiple output frequency, then circuit 20 must be tuned to the vicinity of the newly desired multiple frequency output. Thus, the spectrum generator may put out any desired one of a very large number of controlled frequencies. When continuous tuning over a wide frequency range is provided, the circuit functions as though it were electronically detented. In order to prevent the output frequency $f_0$ from being that of a carrier which is amplitude modulated at the fundamental frequency $f_1$, it is necessary that the oscillations F be periodic at this fundamental frequency. This requirement is most easily fulfilled if the oscillations F are made to disappear in the noise level before the arrival of the next keying pulse as shown.

The variation of the oscillation amplitude of the phase controlling oscillator section results in a change of operation from one mode characterized by the generation of substantially a single frequency output of the periodically phase controlled oscillator section to the spectrum generator mode where in a limited number of adjacent harmonics having substantially the same amplitudes are generated. With the proper regenerative feedback from tap 42, the desired mode of operation may be established over a wide range of fundamental frequencies. Similarly, with the adjustment of the regenerative feedback from tap 46 it is possible to establish the mode of operation over a wide range of output frequencies. When the feedback from tap 46 is reduced by the movement thereof along inductance 40 towards the grid side of resonant circuit 20, the output oscillations $f_0$ will build up within a very few oscillation periods and continue at a constant amplitude for the duration of the regenerative period and, because of the high Q of resonant circuit 20, decay only little in the following degenerative period. This results in the multiplier mode output illustrated in Fig. 3. Increasing the feedback in the periodically phase controlled section broadens the bandwidth of the spectrum amplitude envelope so that there is produced a frequency spectrum output as shown in Fig. 4. Due to the large amplitude to which the periodically controlled oscillations build up at the increased feedback, an increase of the spectrum energy is available within a relatively narrow frequency band. Thus, the regenerative feedback from tap 46 determines the wave shape of the output oscillations $f_0$ and therefore the amplitude envelope of the output spectrum within the frequency range to which circuit 20 is tuned.

With the circuit of Fig. 1 designed to operate as a frequency multiplier, it was found that the unwanted adjacent harmonics were suppressed up to 40 db below the amplitude level of the desired harmonic. Any desired harmonic could be selected at frequency ratios of $f_0/f_1$ from about 20 up to 200. In the spectrum generator mode harmonics of considerably higher order were obtained.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency spectrum generator comprising a vacuum tube having at least a plate, a grid, and a cathode, a pair of discrete resonant means coupled between said plate and said grid for simultaneously generating at said grid self-excited oscillations at a fundamental frequency and a prescribed multiple thereof, said multiple frequency oscillation being keyed by said fundamental frequency oscillation such that the phase of said multiple frequency oscillation is periodic at said fundamental frequency, and discrete regenerative feedback control means in circuit with each of said resonant means.

2. A frequency spectrum generator comprising a vacuum tube having at least a plate, a grid, and a cathode, means including a first and a second parallel resonant circuit coupled respectively in parallel arrangement across said grid and said plate for simultaneously generating at said grid self-excited oscillations at a fundamental frequency and a prescribed multiple of said fundamental frequency, a first regenerative feedback means in circuit with said fundamental frequency generating circuit for controlling the amplitude of said fundamental frequency and second regenerative feedback means in circuit with said multiple frequency generating circuit for controlling the output spectrum envelope of said spectrum generator.

3. The system in accordance with claim 2 wherein said second regenerative feedback is coupled from said multiple frequency resonant circuit to said cathode.

4. The system in accordance with claim 2 and further including an inductance and capacitor in series connection between one terminal of said fundamental frequency generating resonant circuit and said grid, and an inductance connected between the other terminal of said resonant circuit and said plate.

5. A frequency spectrum generator comprising a vacuum tube having at least a plate, a grid, and a cathode, a first tuned circuit coupled between said plate and said grid for generating oscillations at a fundamental frequency, a second tuned circuit coupled between said plate and said grid for generating oscillations at a frequency substantially equal to a prescribed multiple of said fundamental frequency, said oscillations being self-excited and simultaneously generated whereby the multiple frequency oscillation is keyed such that its phase is periodic at said fundamental frequency, a first regenerative feedback circuit coupled from said first tuned circuit to said cathode for controlling the amplitude of said fundamental frequency, and a second regenerative feedback circuit coupled from said second tuned circuit to said cathode for controlling the output spectrum envelope from said second tuned circuit.

6. The spectrum generator in accordance with claim 5 wherein said plate is inductively coupled to one terminal of said first tuned circuit and connected directly to one terminal of said second tuned circuit, and said grid is capacitively coupled to the other terminal of said second tuned circuit and coupled to the other terminal of said first resonant circuit through a series connected inductance and capacitor circuit.

7. A frequency spectrum generator in accordance with claim 1 wherein said fundamental and multiple resonant means comprise parallel resonant circuits.

References Cited in the file of this patent

UNITED STATES PATENTS

| | | |
|---|---|---|
| 2,000,362 | Terman | May 7, 1935 |
| 2,354,262 | Hershberger | July 25, 1944 |